(12) United States Patent
Varga et al.

(10) Patent No.: US 8,201,717 B2
(45) Date of Patent: Jun. 19, 2012

(54) APPARATUS AND METHOD FOR MELTING AND DISPENSING THERMOPLASTIC MATERIAL

(75) Inventors: Leslie J. Varga, Cumming, GA (US); Marcel Puffe, Nordrheinwestfahlen (DE)

(73) Assignee: Nordson Corporation, Westlake, OH (US)

( * ) Notice: Subject to any disclaimer, the term of this patent is extended or adjusted under 35 U.S.C. 154(b) by 193 days.

(21) Appl. No.: 12/158,756

(22) PCT Filed: Jan. 16, 2007

(86) PCT No.: PCT/US2007/060569
§ 371 (c)(1), (2), (4) Date: Jun. 23, 2008

(87) PCT Pub. No.: WO2007/084891
PCT Pub. Date: Jul. 26, 2007

(65) Prior Publication Data
US 2008/0302477 A1 Dec. 11, 2008

Related U.S. Application Data

(60) Provisional application No. 60/759,305, filed on Jan. 17, 2006.

(51) Int. Cl.
*B29C 65/40* (2006.01)
(52) U.S. Cl. .................................. 222/593; 222/590
(58) Field of Classification Search .............. 222/593, 222/590
See application file for complete search history.

(56) References Cited

U.S. PATENT DOCUMENTS

| | | | |
|---|---|---|---|
| 3,773,069 A | 11/1973 | Rebentisch |
| 3,981,416 A | 9/1976 | Scholl |
| 4,084,628 A | 4/1978 | Schmid |
| 4,417,675 A | 11/1983 | Abt et al. |
| 4,441,450 A | 4/1984 | Dettelbach et al. |
| 4,474,311 A | 10/1984 | Petrecca |

(Continued)

FOREIGN PATENT DOCUMENTS

DE 3815089 C2 11/1989
(Continued)

OTHER PUBLICATIONS

European Patent Office, Supplementary European Search Report in EP Appl. No. 07710140, Jan. 27, 2010.
(Continued)

*Primary Examiner* — Christina Johnson
*Assistant Examiner* — Xue Liu
(74) *Attorney, Agent, or Firm* — Wood, Heron & Evans, LLP

(57) ABSTRACT

An apparatus for melting and dispensing thermoplastic material is provided that includes an un-heated hopper having an inlet for receiving particles of a thermoplastic material and an outlet for discharging the particles and a heated manifold including at least one cavity formed therein and having an inlet and an outlet the inlet communicating with the outlet of the hopper for receipt of the particles from the hopper. The hopper is disposed external of the heated manifold. The heated manifold is effective for melting the particles into molten thermoplastic material therein. The apparatus further includes a pump having an inlet in fluid communication with the cavity. An outlet of the pump is in fluid communication with an inlet of a dispenser and an outlet of the dispenser is effective for dispensing the molten thermoplastic material therethrough.

17 Claims, 8 Drawing Sheets

U.S. PATENT DOCUMENTS

| | | | |
|---|---|---|---|
| 4,479,600 A | | 10/1984 | Albright |
| 5,680,961 A | * | 10/1997 | Boccagno et al. ............ 222/143 |
| 5,715,972 A | | 2/1998 | Siddiqui |
| 5,909,829 A | | 6/1999 | Wegman et al. |
| 6,175,101 B1 | | 1/2001 | Miller et al. |
| 6,230,936 B1 | | 5/2001 | Lasko |

FOREIGN PATENT DOCUMENTS

| | | |
|---|---|---|
| DE | 10156691 A1 | 5/2003 |
| WO | 98/14314 A1 | 4/1998 |

OTHER PUBLICATIONS

The State Intellectual Property Office of the People's Republic of China, Office Action in Chinese Application No. 200780002535.0, Apr. 14, 2010.

U.S. Patent and Trademark Office, International Search Report and Written Opinion in corresponding PCT Application Serial No. PCT/US2007/60569, Oct. 3, 2007.

* cited by examiner

APPARATUS AND METHOD FOR MELTING AND DISPENSING THERMOPLASTIC MATERIAL

CROSS-REFERENCES

This application claims the priority benefit of U.S. Provisional Patent Application No. 60/759,305, "Apparatus for Melting and Dispensing Thermoplastic Material", filed on Jan. 17, 2006, which is expressly incorporated by reference herein in its entirety.

FIELD OF INVENTION

The present invention relates to apparatuses and methods for melting and dispensing thermoplastic materials.

BACKGROUND

Thermoplastic materials include those materials that can be repeatedly melted and cooled to a solid. Thermoplastic material includes waxes and thermoplastic adhesives, also referred to as "hot melt" adhesives, etc. "Hot melt" adhesives are used in a wide variety of applications including the assembly of various types of products including furniture, doors, windows, etc., and the closing of boxes, containers, etc.

Typically, solid hot melt adhesive, in various shapes and sizes, is supplied to a melter that includes a heated tank and/or a heated grid to produce molten hot melt adhesive. Solid hot melt adhesive can also be supplied in drums or barrels in which the adhesive is melted by the use of a platen. After heating, the molten adhesive is pumped through a heated hose, to maintain the molten material at the required application temperature, to an applicator or dispenser, sometimes referred to as a dispensing "gun" or gun, or a gun module, comprising a valve and a nozzle. Heated hoses are believed to be a primary source of charring problems associated with hot melt adhesives, particularly in systems requiring relatively low melt rates. In such applications, the residence time of the molten adhesive within a heated hose can exceed the "pot life" of the adhesive as a result of the relatively high volume of molten adhesive within the hose and the relatively low usage rate. "Pot life" as used herein is the maximum time at the system temperature before the adhesive starts to degrade resulting in increased viscosity and charring. Oversized tanks or other reservoirs of molten adhesive can also contribute to this problem. Exceeding the "pot life" of a thermoplastic adhesive may result in operational problems, such as filter clogging, and the cleaning required after charring has occurred.

It is desirable to provide an adhesive dispensing system that reduces charring. It may also be desirable to provide an adhesive dispensing system where the time the material is maintained at elevated temperature is significantly reduced and/or the volume of material is reduced. Finally, it may also be desirable to eliminate the need of heated hoses for transporting liquefied hot melt.

SUMMARY

According to a first aspect of the present invention, an apparatus is provided for melting and dispensing thermoplastic material that may be a hot melt adhesive. The apparatus includes an un-heated hopper having an inlet for receiving particles of a thermoplastic material and an outlet for discharging the particles and a heated manifold including at least one cavity formed therein. The at least one cavity has an inlet communicating with the outlet of the hopper for receipt of the particles of the thermoplastic material from the hopper. The hopper is disposed external of the heated manifold. The at least one cavity further includes an outlet. The heated manifold is effective for melting the particles into molten thermoplastic material therein. The apparatus further includes a pump having an inlet and an outlet, with the inlet of the pump being in fluid communication with the outlet of the at least one cavity. The apparatus also includes a dispenser having an inlet and an outlet. The outlet of the pump is in fluid communication with the inlet of the dispenser, and the outlet of the dispenser is effective for dispensing the molten thermoplastic material therethrough.

Various embodiments of the apparatus of the present invention can also include one or more of the following features. For instance, both the pump and dispenser can be mounted on the manifold. The manifold can include a plurality of cavities formed in the manifold, with the cavities spaced apart from one another and each cavity having an inlet communicating with the outlet of the hopper and an outlet. A collector passage can be fluidicly coupled with the outlet of each of the cavities. The collector passage includes an outlet in fluid communication with the inlet of the pump.

The hopper can be made of a polymeric material. A plurality of the cavities can be formed in the heated manifold, with the cavities spaced apart from one another and each having an inlet communicating with the outlet of the hopper and further including an outlet. In this embodiment, the collector passage can be in fluid communication with the outlet of each of the cavities.

The apparatus can further include a plurality of fins, with each of the fins being disposed intermediate of two adjacent ones of the cavities. In one embodiment, the fins have a triangular-shaped cross-section, with an apex disposed within the outlet of the hopper.

The apparatus can further include an un-heated hose coupled at one end to the inlet of the hopper and having an opposite end effective for receiving the particles of the thermoplastic material therethrough. More particularly, the opposite end of the hose is operatively coupled to a source of pressurized air whereby the opposite end of the hose is effective for suctioning the particles of the thermoplastic material from a supply reservoir of the particles. The hose is effective for transporting the particles to the inlet of the hopper when the pressurized air is flowing within the hose. In this embodiment, the hopper includes an upper portion comprising the inlet of the hopper and further comprises a plurality of apertures formed therein and disposed about a periphery thereof. The apertures are effective for exhausting pressurized air entering the hopper from the un-heated hose.

The apparatus can further include a device effective for moving the particles of the thermoplastic material adhesive around and along the longitudinal axis of the hopper and through the outlet of the hopper. The device can be an auger with a blade having a major diameter which can be either substantially constant or tapered. A motor can be drivingly coupled with the auger.

According to a second aspect of the present invention, a method is provided for melting and dispensing thermoplastic material, comprising supplying particles of a thermoplastic material to an un-heated hopper disposed external of a heated manifold, discharging the particles of the thermoplastic material from the hopper into the heated manifold, melting the particles of the thermoplastic material into molten thermoplastic material within the heated manifold, directing the molten thermoplastic material through the heated manifold to a dispenser mounted on the manifold, and dispensing the molten thermoplastic material from the dispenser onto a workpiece.

In other embodiments, the method can also comprise one or more of the following features. The particles of thermoplastic material can be transported from a supply reservoir of the particles, through an un-heated hose and to the inlet of the hopper. The particles can be discharged from the hopper into the heated manifold solely by gravity. A pre-determined level of the particles within the hopper can be automatically maintained, and the hopper can be mounted on the heated manifold.

According to an alternative embodiment, a method is provided comprising supplying particles of a thermoplastic material to an un-heated hopper having an outlet and a longitudinal axis, with the hopper being disposed external of a heated manifold and moving the particles around and along the longitudinal axis of the hopper to discharge the particles through the outlet of the hopper and into the heated manifold. The method further comprises melting the particles into molten thermoplastic material within the heated manifold, directing the molten thermoplastic material through the heated manifold to a dispenser mounted on the manifold, and dispensing the molten thermoplastic material from the dispenser.

In various embodiments, the method can further comprise one or more of the following features. The particles can be moved around and along the longitudinal axis by an auger disposed within the hopper. The molten thermoplastic material can be directed through the heated manifold to a pump mounted on the manifold and pumped from the pump through the manifold to the dispenser.

According to a third aspect of the present invention a method is provided for bonding two members of a window sash to one another to create a corner of the window sash, with the two members being disposed in abutting relationship with one another. The method comprises mounting an apparatus for melting and dispensing a hot melt adhesive on a dedicated automation device, with the apparatus comprising a heated manifold, an un-heated hopper disposed external of and mounted on the heated manifold, a pump mounted on the heated manifold and a dispenser mounted on the heated manifold. The method further comprises supplying particles of a hot melt adhesive to the un-heated hopper and discharging the particles of the hot melt adhesive from the hopper into the heated manifold. The method also comprises melting the particles of the hot melt adhesive into molten hot melt adhesive within the heated manifold, directing the hot melt adhesive through the heated manifold to the dispenser and aligning the dispenser with an aperture formed in a first one of the two members of the window sash, with the aperture being in fluid communication with a first channel extending between the interior of the first member of the window sash and the interior of the second member of the window sash. The method further comprises injecting the molten hot melt adhesive from the dispenser into and through the aperture into the first channel.

According to a fourth aspect of the present invention, a method is provided for bonding two ends of a filter to one another, the filter being formed into a cylindrical shape with the two ends of the filter being disposed in abutting relationship with one another. The method comprises mounting an apparatus for melting and dispensing a hot melt adhesive on a dedicated automation device, the apparatus comprising a heated manifold, an un-heated hopper disposed external of and mounted on the heated manifold, a pump mounted on the heated manifold and a dispenser mounted on the heated manifold. The method further comprises supplying particles of a hot melt adhesive to the un-heated hopper, discharging the particles of the hot melt adhesive from the hopper into the heated manifold, melting the particles of the hot melt adhesive into molten hot melt adhesive within the heated manifold and directing the molten hot melt adhesive through the heated manifold to the dispenser. The method also comprises aligning the dispenser with the two ends of the filter and dispensing the molten hot melt adhesive between the two ends of the filter to form a seam bonding the two ends together.

BRIEF DESCRIPTION OF THE DRAWINGS

These and other features, aspects and advantages of the present invention will become better understood with regard to the following description, appended claims and accompanying drawings wherein:

DETAILED DESCRIPTION

Figure 1:
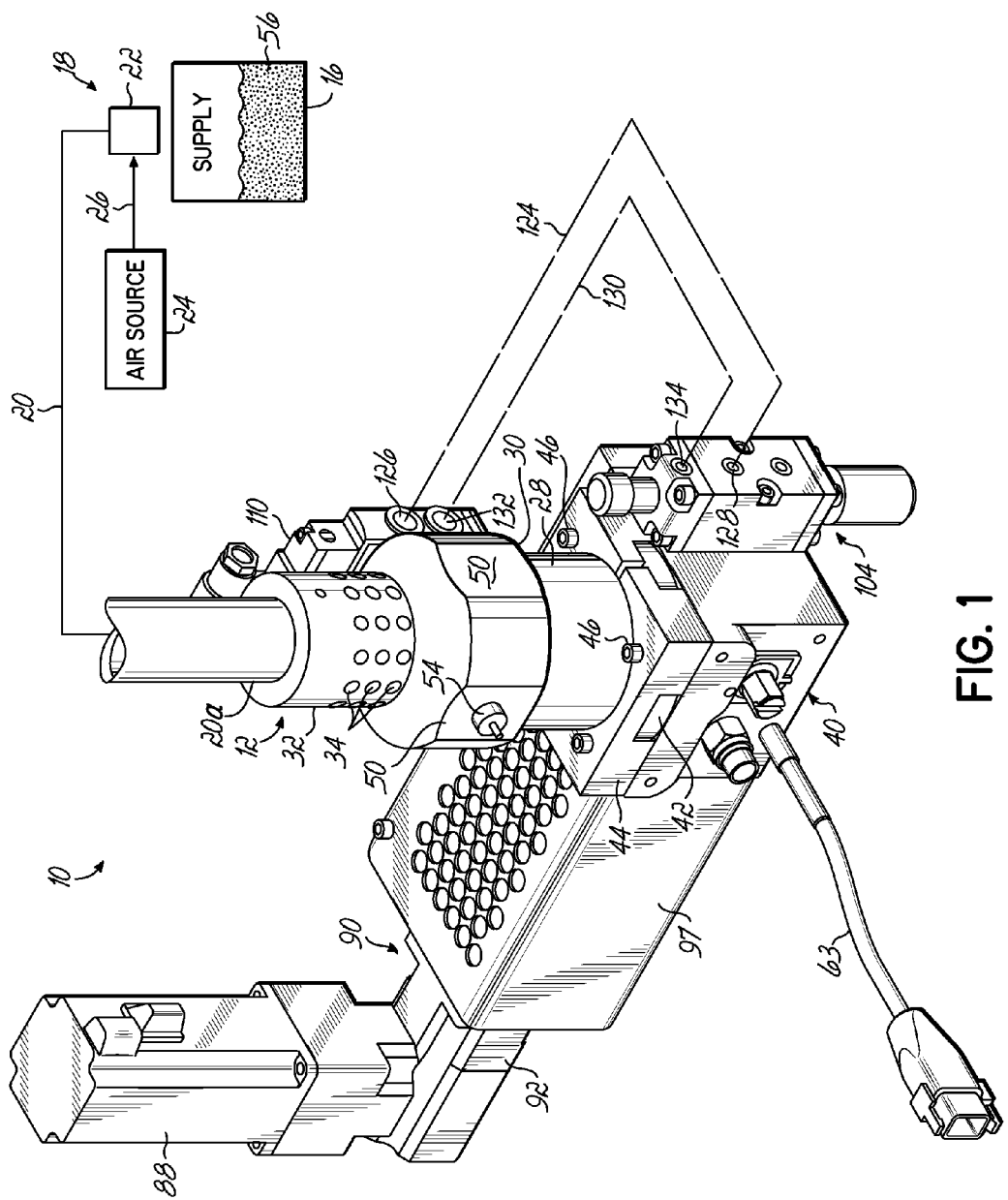
FIG. 1 is an isometric view of an apparatus for melting and dispensing thermoplastic material according to the present invention.
Figure 3:
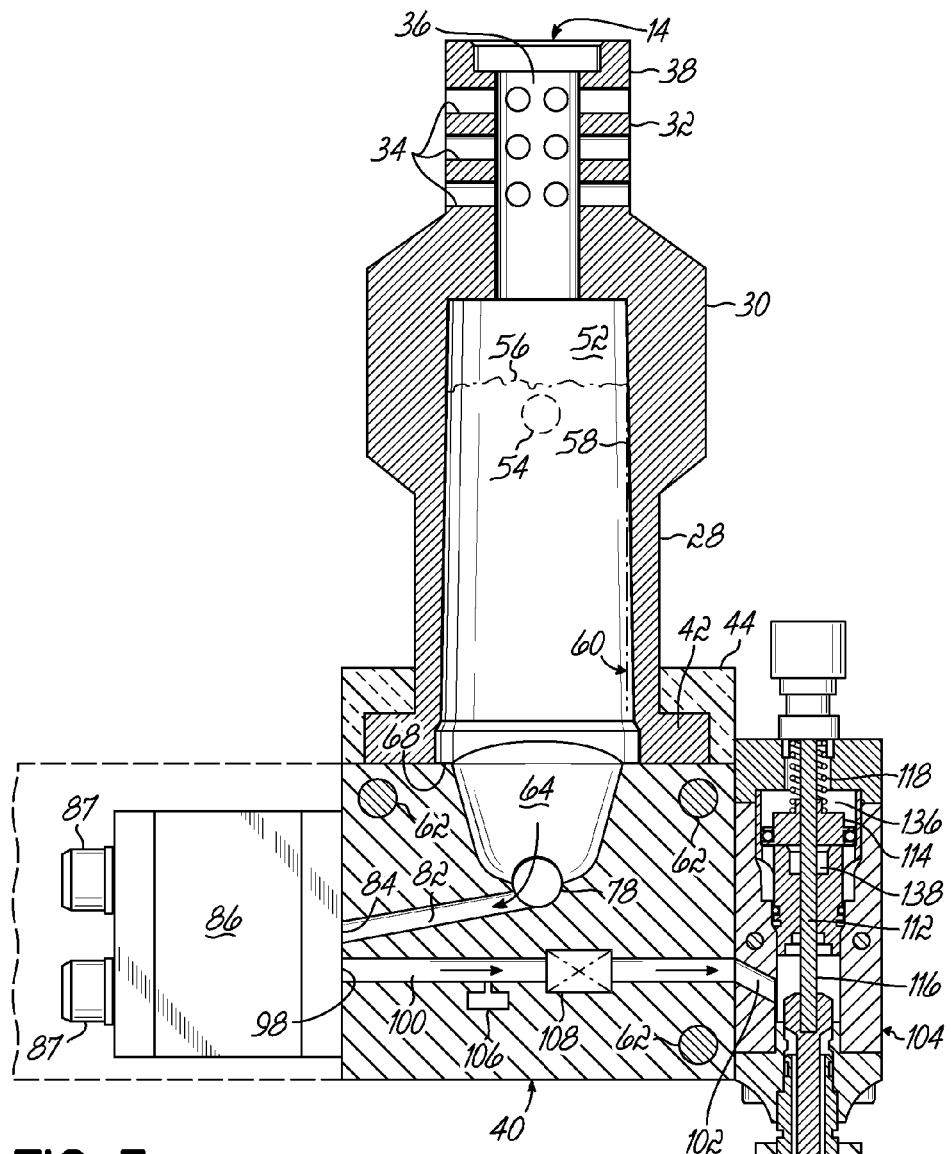
FIG. 3 is a cross-sectional view taken along line 3-3 in FIG. 2.

Referring now to FIG. 1 and FIG. 3, an apparatus 10 for melting and dispensing thermoplastic material such as hot melt adhesives is illustrated. Although apparatus 10 can be used to dispense various thermoplastic materials, it is particularly advantageous when used to dispense hot melt adhesive, and the apparatus 10 will be described herein in conjunction with this application. Apparatus 10 includes a hopper 12 having an inlet 14 (shown in FIG. 3) effective for receiving solid particles of a hot melt adhesive, such as in pellets or chicklets, from a supply reservoir or tank 16. In the illustrative embodiment, the solid particles of the hot melt adhesive are supplied to the inlet 14 of hopper 12 by an automatic feed system 18 such as the FillEasy™ Adhesive Feed System or the Fillmaster® Adhesive Feed System, both made by the Nordson Corporation. As used herein the term "solid particles" refers to particles that are in the solid state, not the liquid or molten state. However, as may be appreciated by one skilled in the art, solid particles can have varying degrees of hardness depending upon factors such as exposure to atmosphere, for example. Accordingly, some solid particles may be somewhat "soft to the touch". The automatic feed system 18 includes an un-heated transport hose 20 coupled at one end 20a to the inlet 14 of hopper 12 and terminating at an opposite end in a suction wand 22. A source of pressurized air 24 is supplied to the suction wand 22 via one or more conduits 26. More particularly, the pressurized air is supplied to a venturi pump (not shown) contained within the suction wand 22. The suction wand 22 is disposed proximate the inlet of the supply reservoir 16 of the solid particles of the hot melt adhesive and the venturi pump included in the suction wand is effective for suctioning the solid particles of the hot melt adhesive out of supply reservoir 16 and into hose 20, and for transporting or pumping the solid particles of the hot melt adhesive through hose 20 to the inlet 14 of hopper 12 via pressurized air.

Alternatively, a screw conveyor or other transport system can be used to transport the solid particles of the hot melt adhesive from supply tank 16 to the inlet 14 of hopper 12. As a further alternative, the automatic adhesive supply system 18 can be omitted, with the solid particles of the hot melt adhesive being manually fed into the inlet 14 of the hopper 12. In this case, the hopper can include a lid, which can be opened for manual supply of the particles into the hopper 12 and be otherwise closed.

In the illustrative embodiment shown in FIG. 1, the hopper includes a lower portion 28, intermediate portion 30 and upper portion 32. The upper portion 32 is a hollow cylinder which is suitable for accepting hose 20. The upper portion 32 includes a plurality of apertures 34 formed therein and disposed about a periphery of the upper portion 32. Each of the apertures 34 communicates with an interior chamber 36 (FIG. 3) formed by the upper portion 32 of hopper 12 and open onto an exterior surface 38 of the upper portion 32. Accordingly, apertures 34 are effective for exhausting pressurized air entering chamber 36 from the hose 20, to the atmosphere exterior of hopper 12.

Apparatus 10 includes a heated manifold 40 and hopper 12 may be mounted to manifold 40 or closely coupled thereto. The lower portion 28 of hopper 12 includes a peripheral flange 42 that is disposed in contacting engagement with manifold 40. A clamp 44, made of an insulating material, is configured to receive the peripheral flange 42 and is used to mount the hopper 12 on manifold 40. The clamp 44 may be secured by a plurality of conventional fasteners, such as bolts 46 (FIG. 1), which pass through apertures (not shown) formed in the clamp 44 and into mating apertures 48 formed in the manifold 40, as best appreciated with reference to the exploded assembly view shown in FIG. 2. The insulated clamp 44 is effective for maintaining the peripheral flange 42 of the hopper 12 at an acceptable temperature. Flange 42, as well as the remainder of hopper 12 can be made of an insulating material. For example, hopper 12 can be made of a polymeric material having a relatively low thermal conductivity such as polytetrafluoroethylene, commonly referred to as Teflon®. In contrast, the manifold 40 is made of a metal having a relatively high coefficient of conductive heat transfer, such as aluminum.

Figure 2:
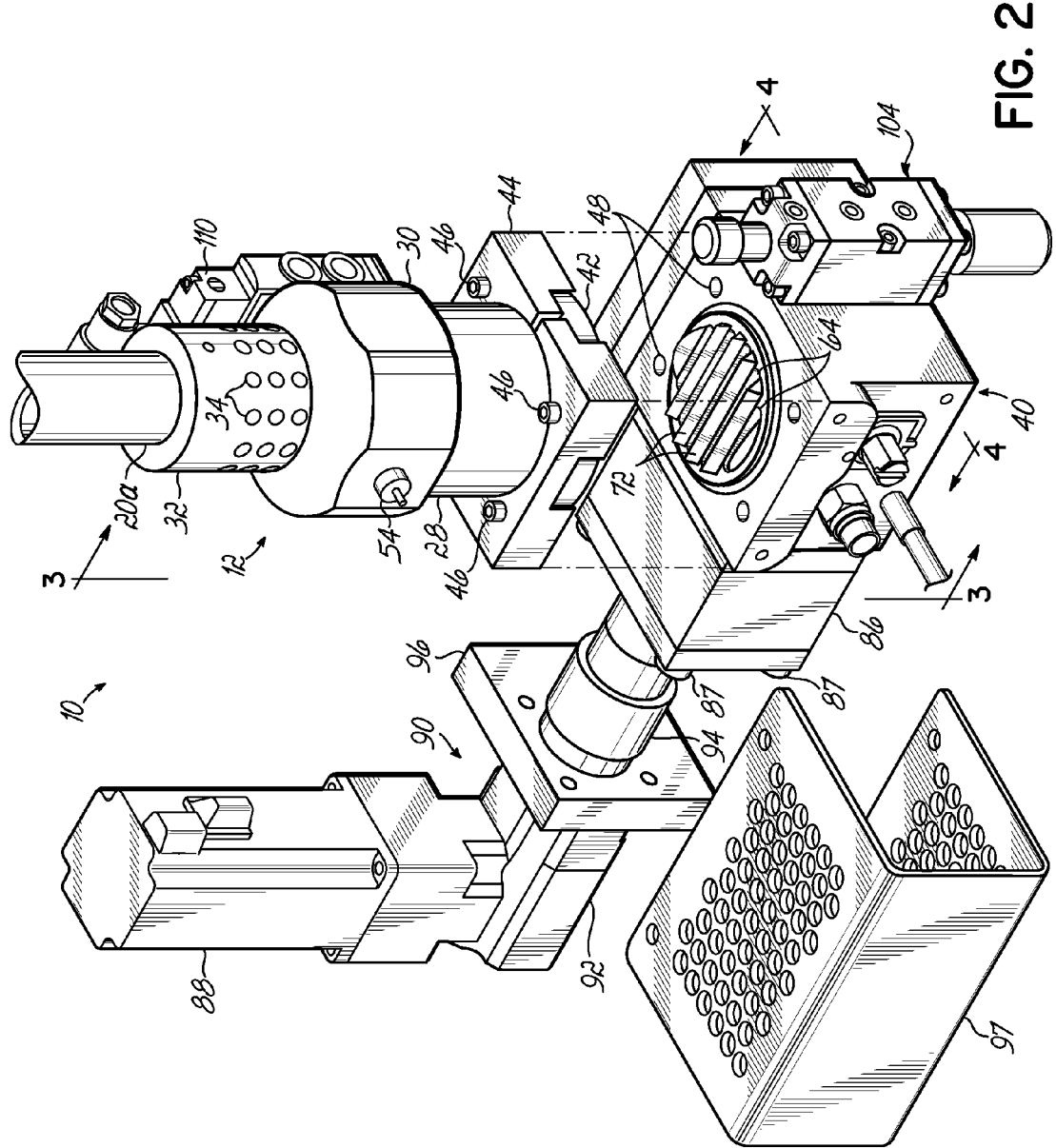
FIG. 2 is an isometric view similar to FIG. 1 but with the included hopper shown in exploded assembly view to further illustrate the included heated manifold.

With reference to FIGS. 1 and 2, the periphery of the intermediate portion 30 of hopper 12 may have an irregular shape that includes two surfaces 50 that may be concave as shown. Alternatively, surfaces 50 may be substantially flat-machined surfaces. A hole can be formed in and extend through the intermediate portion 30 of hopper 12 such that one end of the hole opens onto an interior chamber 52 (FIG. 3) that is defined by the lower 28 and intermediate 30 portions of hopper 12. The opposite end of the hole opens onto one of the concave surfaces 50 of the intermediate portion 30 of hopper 12. A level sensor 54 can extend through the aperture formed in the intermediate portion 30 such that a distal end of the level sensor 54 is disposed within the interior chamber 52. The distal end of the sensor 54 can be substantially flush with an inner surface 58 of hopper 12. When the level of the solid particles 56 of hot melt adhesive falls below the level sensor 54, the sensor 54 can send a signal to a controller (not shown) that controls the adhesive supply system 18 such that additional hot melt adhesive is transported from the supply reservoir 16 through hose 18 into hopper 12.

The opening in the bottom of hopper 12 can be larger than the opening in the top of hopper 12, such that the inner surface 58 of hopper 12 forms a relatively small angle 60, such as about 5°, with the vertical. This flared surface 58 facilitates movement of the particles 56 of the hot melt adhesive through hopper 12.

Figure 4:
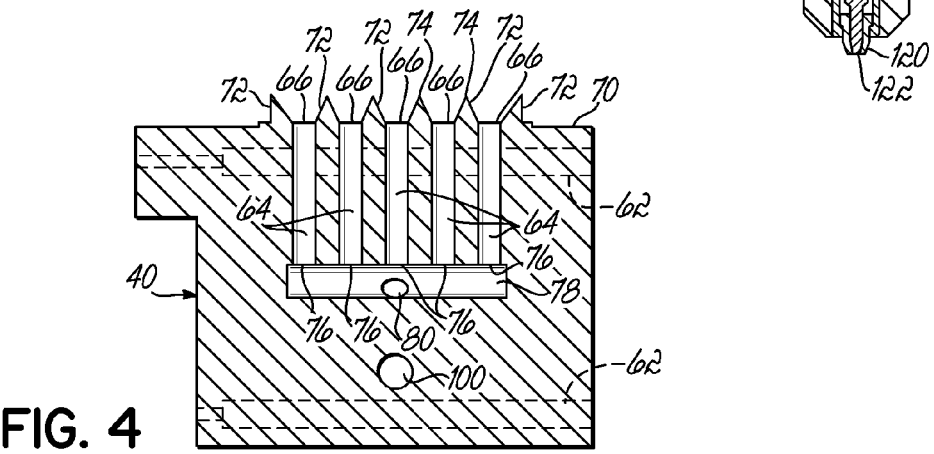
FIG. 4 is a cross-sectional view taken along line 4-4 in FIG. 2.

A plurality of heating elements 62 are disposed within manifold 40 and extend substantially therethrough as illustrated in FIGS. 3 and 4. In the illustrative embodiment, each of the heating elements 62 are electrical resistance heating elements. An electrical cord set 63 is provided that is electrically coupled to heating elements 62 and can be coupled to a source of electricity (not shown). Heating elements 62 are effective for transferring heat substantially throughout the manifold 40 via conduction. The particular positioning of heating elements 62 within manifold 40 will be discussed in greater detail subsequently.

A plurality of cavities 64 can be formed in manifold 40 and spaced apart from one another. Each of the cavities 64 includes an inlet 66 (FIG. 4) that communicates with an outlet 68 (FIG. 3) of hopper 12. Accordingly, the solid particles 56 of the hot melt adhesive are free to drop into the cavities 64 under the action of gravity. The inlets 66 of the cavities 64 open onto an upper surface 70 of manifold 40. Manifold 40 further includes a plurality of fins 72 that protrude upwardly from surface 70 and extend into the outlet 68 of hopper 12. Each of the fins 72 can have a triangular-shaped cross-section with a sharp, upwardly pointing apex 74 at the interface of two sides of the triangular shape of the fins 72. The triangular shape of fins 72 helps guide the adhesive into cavities 64 and ensures that the solid particles are not impeded from entering cavities 64. Additionally, the triangular shape of fins 72 provides increased surface area, relative to fins having a rectangular cross-section for instance, which is advantageous with respect to heat transfer to the adhesive. Since the hopper 12 is un-heated it remains at ambient temperature with the exception of the lowermost portion which receives heat transfer from the heated manifold 40.

Melting occurs within cavities 64 and transforms the solid particles into molten, hot melt adhesive, by the time the material discharges from cavities 64. Each of the cavities 64 includes an outlet 76 proximate the bottom of the corresponding cavity 64. Each of the outlets 76 are in fluid communication with a collector passage 78 formed in manifold 40. The molten hot melt adhesive discharges from the collector passage 78 through an outlet 80 to a pump supply passage 82. The pump supply passage 82 is in fluid communication at one end with the outlet 80 of the collector passage 78, and therefore with each of the cavities 64, and is in fluid communication at the opposite end with an inlet 84 of a pump 86. As shown in FIG. 3, the pump supply passage 82 slopes downwardly from outlet 80 to pump inlet 84 so the adhesive can flow to pump inlet 84 under the force of gravity.

In the illustrative embodiment of FIGS. 1-4, the pump 86 is a metered gear pump that is drivingly coupled with a motor 88, via a drivetrain indicated generally at 90. The motor 88 can be a servo motor and the drivetrain 90 can include a gear box 92 receiving a rotatable output shaft (not shown) of the motor 88 and a coupling 94 disposed between the gear box 92 and the pump 86. The motor 88 and associated drivetrain control the speed of pump 86. Pump 86 may be mounted on manifold 40. In the illustrative embodiment, pump 86 is attached to manifold 40 by conventional fasteners such as bolts 87 which pass through a housing of pump 86 and into manifold 40. Alternatively, other pumps could be utilized, including piston pumps.

A cover 97 is optionally provided that covers motor 86 and a portion of drivetrain 90. A bracket 96 can be disposed in surrounding relationship with a portion of the drivetrain 90 and can be used to mount apparatus 10 to a portion of an overall system for dispensing hot melt adhesive that can be a stationary structure or a dedicated automation device.

The molten hot melt adhesive discharges from pump 86 through outlet 98 into a pump discharge passage 100 that is in fluid communication at an opposite end with an inlet 102 of a dispenser 104. Dispenser 104 may be mounted directly on manifold 40. A pressure transducer 106 can be disposed in manifold 40 in fluid communication with the pump discharge passage 100 so that it is effective for measuring the pressure of the molten hot melt adhesive discharging from pump 86. Pressure transducer 106 can be electrically coupled to a control panel (not shown) and can provide an annunciation or alarm signal to an operator controlling apparatus 10 which advises the operator that the pump discharge pressure of the molten adhesive is outside of the desired operating range. Apparatus 10 can include a filter 108 disposed in the pump discharge passage 100 to filter fine particles of solid material that may exist within the molten adhesive.

A suitable dispenser 104 is the model AG-900 gun module made by the Nordson Corporation, which is a pneumatically operated module. However, a wide variety of other pneumatically or electrically operated guns can also be used that are made by Nordson Corporation for extruding or potentially fiberizing hot melt adhesive. In the illustrative embodiments, a source of pressurized air (not shown) is supplied to a solenoid valve 110 (FIG. 1), which can comprise a conventional 4-way solenoid valve. The dispenser 104 can include a pneumatically actuated, reciprocating piston element 112 that includes a disk 114 and a stem 116 integral with disk 114. The piston element 112 can be biased in a closed position via spring 118 such that the stem 116 is disposed against valve seat 120, thereby closing an outlet 122 of the gun 104.

A conduit 124, such as tubing, interconnects a port 126 on solenoid valve 110 with a port 128 on the dispenser 104. Another conduit 130 interconnects a port 132 on solenoid valve 110 with a port 134 on dispenser 104. Port 134 is in fluid communication with an internal cavity 136 disposed proximate one side of the disk 114 and port 128 is in fluid communication with an internal cavity 138 disposed proximate an opposite side of the disk 114. Accordingly, when an operator wishes to open the dispenser 104, such that molten hot melt adhesive can discharge through outlet 122, the solenoid valve 110 is operated to provide pressurized air to the internal cavity 138 and simultaneously vent cavity 136, such that a force is exerted on disk 114 that overcomes the biasing force of spring 118 and lifts the reciprocating piston element 112 off of valve seat 120, thereby opening the dispenser 104. When an operator wishes to close the dispenser 104, pressurized air is supplied to cavity 136, while cavity 138 is simultaneously vented, via solenoid valve 110.

Figure 5:
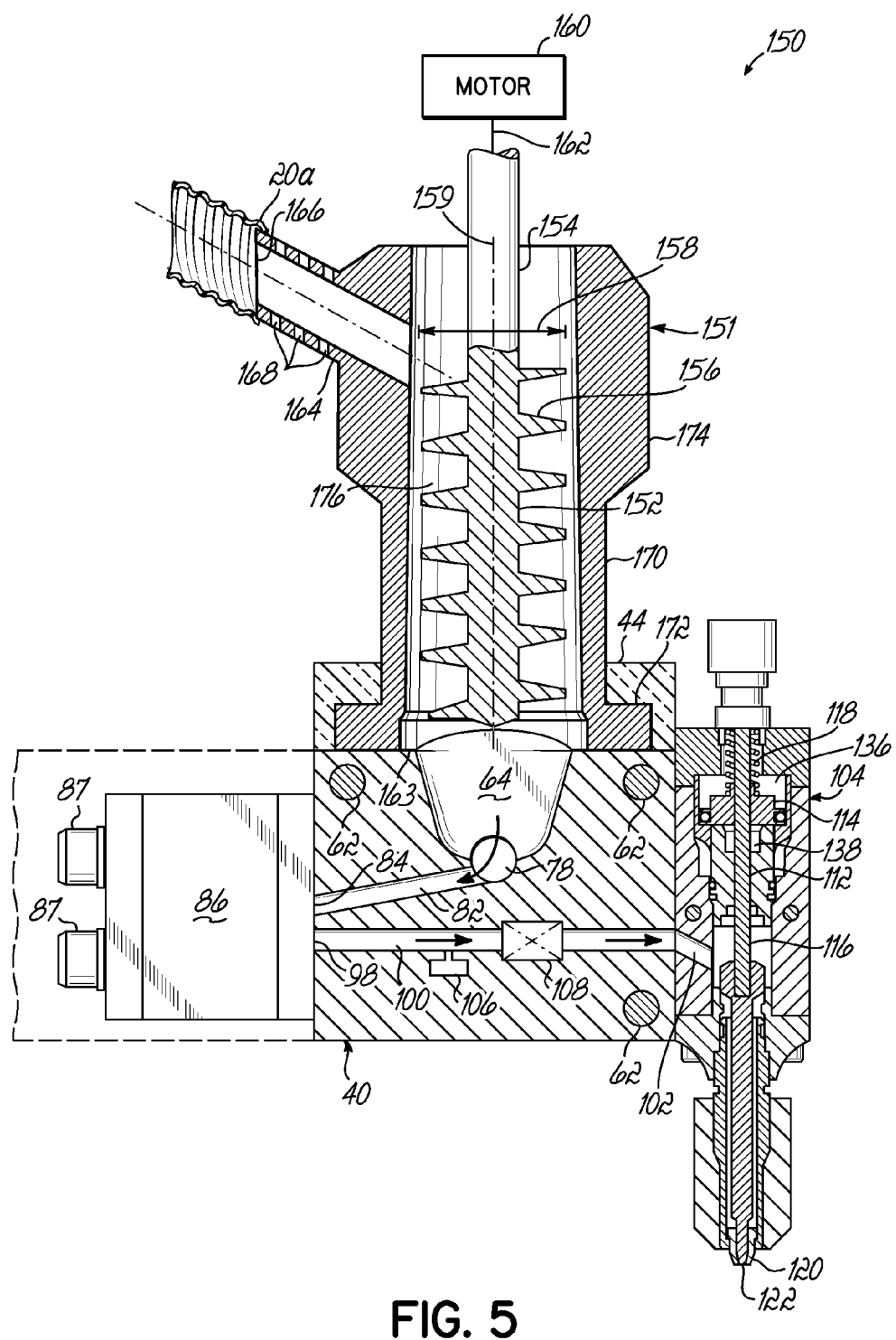
FIG. 5 is a cross-sectional view similar to FIG. 3 illustrating an alternative embodiment of an apparatus for melting and dispensing thermoplastic material according to the present invention.

FIG. 5 illustrates an apparatus 150 for melting and dispensing hot melt adhesive according to an alternative embodiment of the present invention. Apparatus 150 is the same as apparatus 10 with the following exceptions. Apparatus 10 includes a rotatable auger 152 disposed within a hopper 151. Both hopper 151 and auger 152 can be made of an insulating material. For example, a polymeric material having a relatively low thermal conductivity such as polytetrafluoroethylene, commonly referred to as Teflon®, can be used. The auger 152 includes a shaft 154 and a helical blade 156 integral with the shaft 154. The blade 156 has a major diameter 158 that is substantially constant throughout the longitudinal length of the auger 152. Accordingly, auger 152 is considered to be a straight auger. Auger 152 is drivingly coupled with a motor 160 and, more particularly, a rotating output shaft 162 of motor 160 is drivingly coupled with the shaft 154 of auger 152. A gear box (not shown) and coupling (not shown) may be interposed between motor 160, which can be an electric motor, and auger 152 as required. Alternatively, auger 152 can be driven by a pneumatic device. The auger 152 is effective for moving the solid particles of the hot melt adhesive around and along a longitudinal axis 159 of hopper 151 and through outlet 163 of hopper 151 into cavities 64.

The auger 152 is sized and configured with an appropriate pitch such that the feed rate of the solid particles 56 into cavities 64 is greater than the melt rate of particles 56 within cavities 64. This produces a desired back pressure on the hot melt adhesive within cavities 64 to increase the melt rate and fluid momentum as it is dispensed. Hopper 151 includes a side mounted inlet port 164 formed therein and including an inlet 166 effective for receiving the solid particles 56 of hot melt adhesive therethrough. The hose 20 of the adhesive supply system 18 can be coupled to the inlet port 164 and communicates with inlet 166. A plurality of apertures 168 are formed in the inlet port 164 and are effective for exhausting pressurized air entering the inlet port 164 from hose 20, in the same manner as discussed previously with respect to apertures 34 of apparatus 10. Hopper 151 has a lower portion 170 with a peripheral flange 172 that are the same as the lower portion 28 and peripheral flange 42 of apparatus 10. Hopper 151 further includes an upper portion 174 that includes the inlet port 164. A level sensor such as the previously discussed sensor 54 (not shown in FIG. 5) can be disposed in the upper portion 174 such that a distal end of the level sensor is disposed within an interior chamber 176 of hopper 151. The remaining features and functions of apparatus 150 are the same as apparatus 10 discussed previously.

In another alternative embodiment, the pump 86, motor 88 and drivetrain 90 can be omitted from apparatus 150. In this case, the outlet (not shown in FIG. 5) of the collector passage 78 is in fluid communication with the inlet 102 of the dispenser 104. Pressure transducer 106 and filter 108 can also be included in this embodiment.

Figure 6:
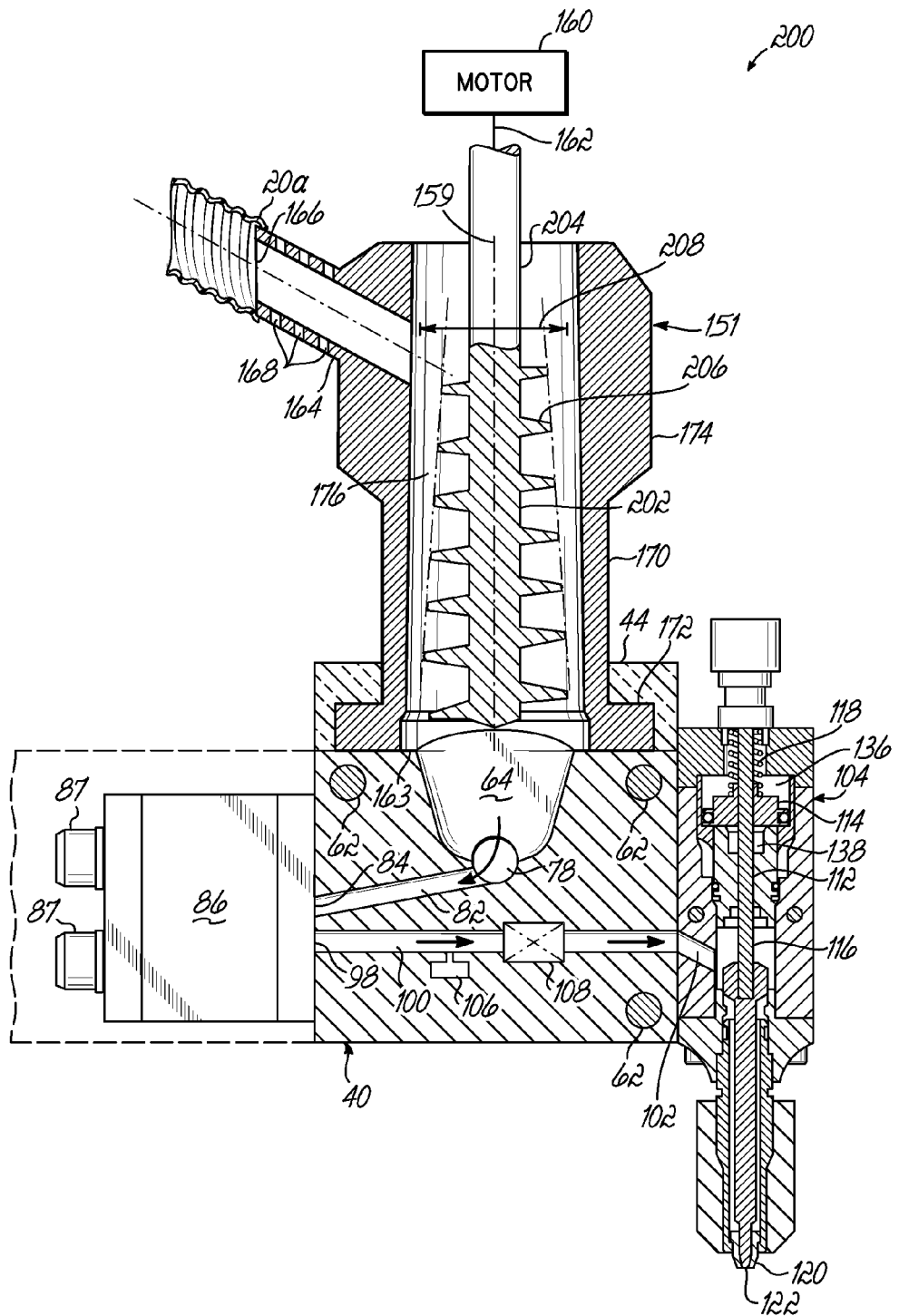
FIG. 6 is a cross-sectional view similar to FIG. 5 illustrating another alternative embodiment of an apparatus for melting and dispensing thermoplastic material according to the present invention.

FIG. 6 illustrates another apparatus 200 for melting and dispensing hot melt adhesive according to the present invention. In this embodiment, auger 152 is replaced with an auger 202 having a shaft 204 and a helical blade 206 integral with the shaft 204. As with auger 152, auger 202 can be made of an insulating material. For example, a polymeric material having a relatively low thermal conductivity such as polytetrafluoroethylene, commonly referred to as Teflon®, can be used. The blade 206 includes a major diameter 208 that is tapered outwardly from top to bottom and accordingly, auger 202 is considered to be a tapered auger. The structural features and functions of apparatus 200 are otherwise the same as apparatus 150. Since the major diameter 208 of blade 206 is smaller proximate the inlet port 164, additional space is provided to receive the solid particles 56 of hot melt adhesive.

During operation of apparatus 10, feed system 18 automatically maintains a pre-determined level of the solid particles 56 of the hot melt adhesive within hopper 12 based on feedback provided by level sensor 54. The feed system 18 may operate independently of the operation of motor 88, pump 86 and dispenser 104. A controller (not shown), which can be a programmable logic controller for instance, associated with a parent machine, such as the subsequently discussed dedicated automation device 300 illustrated schematically in FIG. 11, sends an "ON" signal to the controller (not shown), such as a programmable logic controller, associated with motor 88 and dispenser 104 when it is desired to dispense the molten or fluid hot melt adhesive out of dispenser 104. This controller then sends synchronized signals to motor 88, to start, and to the solenoid valve 110 causing dispenser 104 to open. These signals can be synchronized so that dispenser 104 is opened before motor 88 and pump 86 are turned on to avoid damage to dispenser 104 that could occur if motor 88 and pump 86 would be turned on before dispenser 104 is opened. One or more time delay relays can be used to synchronize opening dispenser 104 and then turning on motor 88 and pump 86. The molten hot melt adhesive is then discharged from dispenser 104 onto a workpiece, for example the window sash 256 illustrated in FIGS. 7 and 8 or the filter 290 illustrated in FIGS. 9 and 10.

The operation of apparatus 150 and apparatus 200 are the same as apparatus 10, when pump 86, motor 88 and drivetrain 90 are included, except that the included augers 152 and 202, respectively, force the particles 56 out of hopper 151, instead of the particles discharging from hopper 151 solely by gravity as is the case with hopper 12 of apparatus 10.

The apparatuses 10, 150 and 200 of the present invention can be used in a wide variety of applications, with the use of these apparatuses being particularly advantageous in those applications having relatively low dispense or discharge rates, for example dispense rates of about 1 lb/hr of hot melt adhesive. Apparatus 10 minimizes the "residence time" of the hot melt adhesive within apparatus 10 prior to dispensing the hot melt adhesive from dispenser 104. More particularly, the "residence time" of the hot melt adhesive within apparatus 10 is less than the pot life of the hot melt adhesive, thereby at least minimizing charring problems associated with the hot melt adhesive. As used herein, "residence time" is the time the hot melt adhesive is in a molten state.

The following features of apparatus 10 contribute to the minimization of residence time of the hot melt adhesive within apparatus 10. Hopper 12 is un-heated and may be made of a material having a relatively low thermal conductivity, i.e., a material having a relatively low coefficient of conductive heat transfer. Further, the hopper 12 is disposed external of heated manifold 40. Although hopper 12 may be mounted on heated manifold 40, the clamp 44, which is made of an insulating material, may be used to receive the peripheral flange 42 of hopper 12 to mount hopper 12 on heated manifold 40 and to discourage heat transfer from the heated manifold 40 to hopper 12. As a result of the foregoing, the hot melt adhesive within hopper 12 is generally not melted and remains in a solid state (although some softening may occur). The solid hot melt adhesive, such as particles 56, is discharged into manifold 40 on an "on-demand" basis in response to dispensing the molten hot melt adhesive from dispenser 104.

The total combined volume of all of the cavities 64 and the heating capacity of heating elements 62 are selected so that the melt rate of heated manifold 40 is greater than, but relatively close to, the dispense rate of the hot melt adhesive. For example, in one embodiment apparatus 10 may have a dispense rate of about 1 lb/hr and the melt rate of manifold 40 may be about 2 lbs/hr to about 4 lbs/hr. When a metered gear pump is used, such as pump 86, a precise metered amount of molten thermoplastic material discharges from pump 86 and flows through pump discharge passage 100 to the inlet 102 of dispenser 104. In view of the foregoing dispense and melt rates, hopper 12 may be relatively small. For example, in one embodiment hopper 12 may have an overall length of about eight inches and may have an inside diameter of about one to two inches within the intermediate portion 30 of hopper 12. Inner surface 58 may be tapered as discussed previously. Therefore, the inside diameter may vary somewhat within the intermediate portion 30 of hopper 12 and the lower portion 28 of hopper 12. The maximum outside dimension of the intermediate portion 30 varies with the corresponding inside diameter and therefore may be about two to three inches, for example. Accordingly, apparatus 10 more closely approximates an ideal goal of "melting upon demand", as compared to various conventional hot melt dispensing systems having melt rates which can significantly exceed, for example, by an order of magnitude or more, the associated dispense rate.

Dispenser 104 is closely coupled to the heated manifold 40 and may be mounted on manifold 40. This results in essentially achieving melting at the point of application, i.e., where the molten hot melt adhesive is dispensed onto a workpiece. Accordingly, the necessity of having a heated hose extending between a heated manifold or other heated reservoir and an associated, remotely mounted dispenser, is eliminated by the use of apparatus 10.

Figure 7:
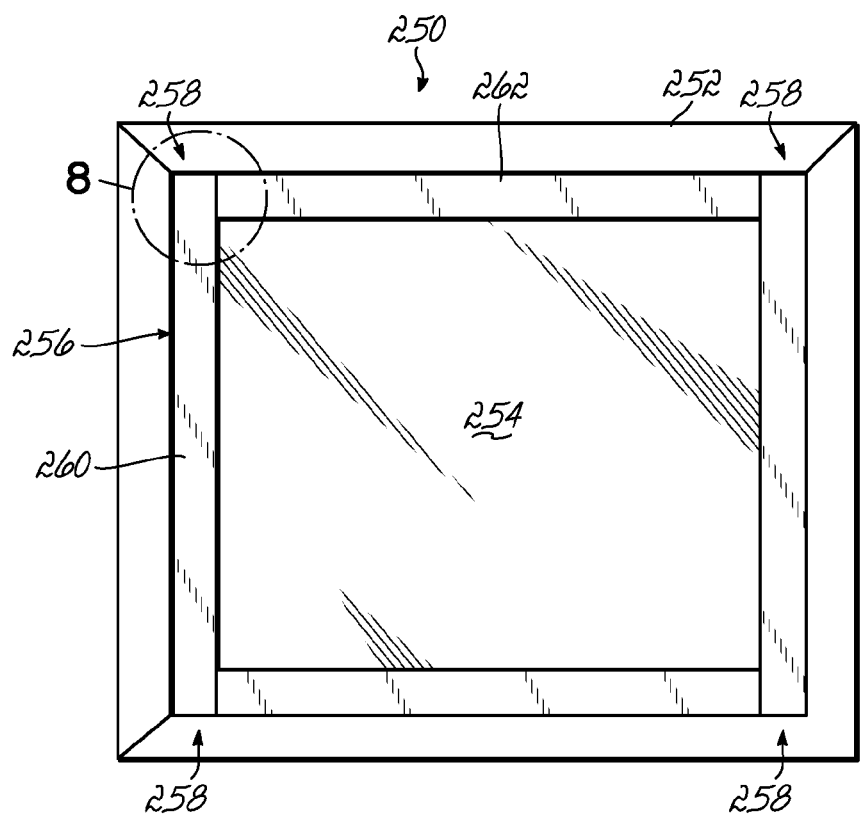
FIG. 7 is a plan view of a window including a window sash.
Figure 8:
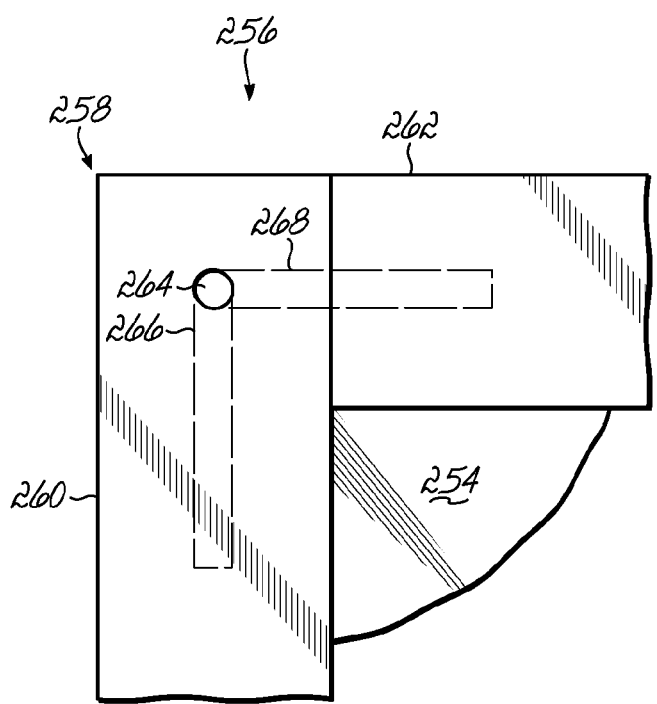
FIG. 8 is an enlarged view of the area circled in FIG. 7 further illustrating one of the corners of the window, illustrating one application of the apparatus of the present invention.
Figure 11:
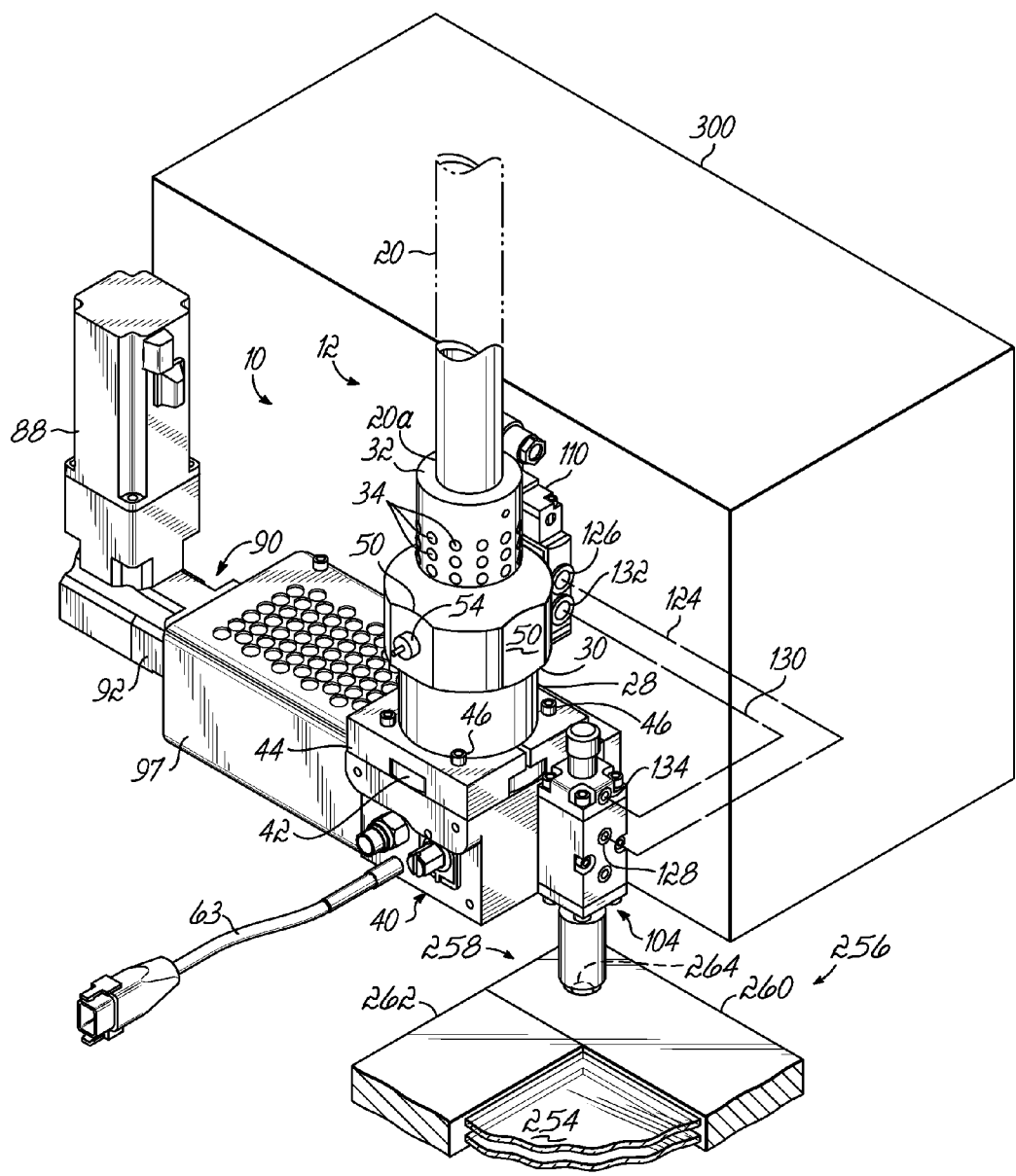
FIG. 11 is a perspective view illustrating one application of the apparatus of the present invention.

FIGS. 7, 8 and 11 illustrate one low dispense rate application where the apparatus of the present invention, such as apparatus 10, 150 or 200, can be used to strengthen the corner joint bonding of pultruded windows. FIG. 7 illustrates a window 250 having a frame 252 that can be mounted to a wall of a structure (not shown) and a pane of glass 254 secured by a window sash 256, which in turn is secured to the window frame 252.

Windows can be made of various materials with the window corner members secured to one another using different methods. For example, corner members of vinyl windows may be welded, corner members of aluminum windows may be mechanically fastened and corner members of wood windows may be joined using adhesive or mechanical fasteners. Pultruded window corners, i.e., corners of windows constructed of a fiber-reinforced composite, such as corner 258 of window sash 256 illustrated in FIG. 8, are bonded with an adhesive, such as a hot melt adhesive.

Pultruded window corners, such as corner 258, include an inner core constructed of composite wood or fiberglass. Wood veneer or vinyl profiles are laminated to the inner core. The structural integrity of the corner, such as corner 258, is critical and this structural integrity can be achieved by injecting the corner 258 with hot melt adhesive as follows.

The corner 258 joins a vertical member 260 of sash 256 with a horizontal member 262 which are placed in abutting relationship with one another and then bonded together. As shown in FIG. 8, vertical member 260 includes an aperture 264 that extends from the outer surface of member 260 into the interior of member 260. Aperture 264 is in fluid communication with a channel 266, located in the interior of member 260, and a channel 268 formed in the interior of member 260 and extending into the interior of member 262. While channels 266 and 268 are shown as forming a 90° angle therebetween, they can be formed at different angles relative to one another and different numbers of channels can emanate from aperture 264. Other configurations and combinations of various numbers of apertures and channels may also be used. Sash 256 includes two of the vertical members 260, two of the horizontal members 262 and four corners 258, each formed by joining one of the vertical members 260 to one of the horizontal members 262. Each of the corners 258 may include the aperture 264 and channels 266 and 268, oriented appropriately for the particular corner 258.

The heated manifold 40, hopper 12, pump 86 and dispenser 104 of apparatus 10, 150 or 200 may be mounted on the dedicated automation device 300, illustrated schematically in FIG. 11. Mounting hopper 12, pump 86 and dispenser 104 on heated manifold 40 provides a compact unit that minimizes the space required to mount these components on a dedicated automation device such as device 300. The space required is further minimized due to the relatively small size of hopper 10 and heated manifold 40 as compared to some conventional systems having relatively large tanks or other reservoirs of molten thermoplastic material. This is illustrated schematically in FIG. 11 for apparatus 10, with the un-heated hose 20 coupled to hopper 12 as discussed previously. After aligning dispenser 104 with aperture 264 formed in the vertical member 260 of window sash 256, the molten hot melt adhesive may be dispensed from dispenser 104 and injected into and through aperture 264 and into channels 266 and 268, thereby bonding members 260 and 262 of window sash 256 to one another when the molten hot melt adhesive cools and solidifies.

The members of additional corners 258 of window sash 256 can be bonded in a similar manner with the alignment of dispenser 104 and the corresponding aperture 264 in one of the members of sash 256 being achieved by changing the relative positions of dispenser 104 and window sash 256. This may be achieved by moving dispenser 104, as well as the other components of apparatus 10 mounted on device 300, so as to change the position of dispenser 104, or by repositioning window sash 256, using various conventional devices known in the art. As a further alternative, multiple apparatuses 10, 150, or 200 may be mounted on device 300, with each being used to bond the two members of one of the corners 258 of sash 256 to one another. In this event, the multiple apparatuses 10, 150 or 200 may be manifolded together with respect to the supply of the solid particles of hot melt adhesive, with the dispenser 104 of each apparatus being aligned with the corresponding aperture 264 of window sash 256.

The apparatus of the present invention, such as apparatus 10, 150 or 200, can be used in conjunction with the foregoing methodology to bond members of window corners that are not pultruded window corners, i.e., window corners made from a construction different than a fiber reinforced composite. Additionally, adhesive may also be applied to the abutting surfaces of members 260 and 262.

Figure 9:
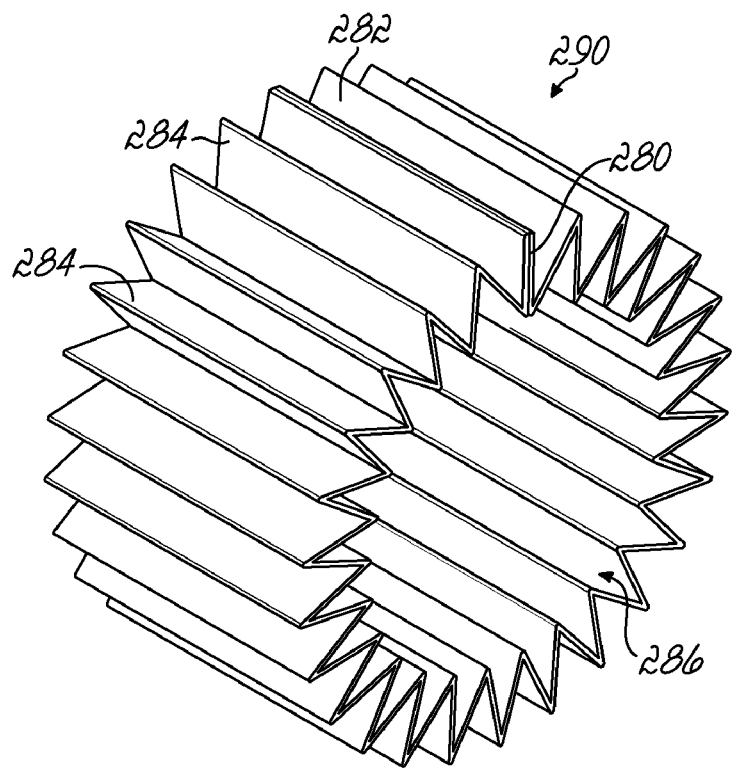
FIG. 9 is an isometric view of a filter illustrating another application of the apparatus of the present invention.
Figure 10:
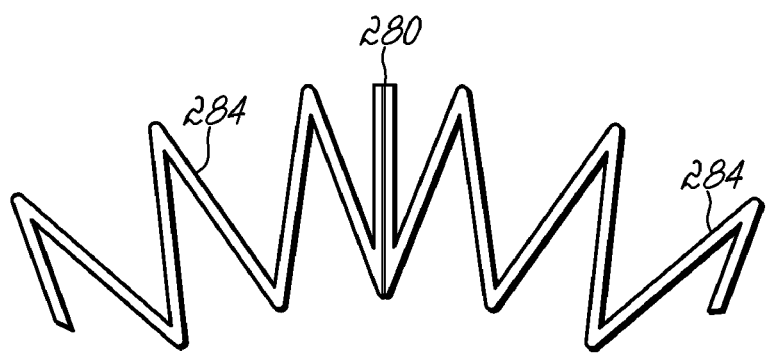
FIG. 10 is an enlarged, fragmentary schematic representation of a portion of the filter shown in FIG. 9.

FIGS. 9 and 10 illustrate another application where the apparatus of the present invention, such as apparatus 10, 150 or 200, can be used to create a side seam 280 of a filter 290 shown in FIG. 9, where filter 290 may be an oil filter for a motor vehicle for example. Filter 290 is constructed of a filter material 282 that is formed into a plurality of pleats 284 disposed about the periphery of filter 290, from a flat sheet or block of the filter fabric. The pleated block is then formed into the cylindrical shape shown in FIG. 9, with the ends of the pleated block disposed in abutting relationship. The heated manifold 40, hopper 12, pump 86 and dispenser 104 may be mounted to the dedicated automation device 300 as illustrated schematically in FIG. 11. Dispenser 104 may then be aligned with the two ends of filter 290 and seam 280 can be formed, bonding the two ends of the pleated block together, by dispensing the molten hot melt adhesive from dispenser 104 onto one or both of the two ends of the pleated block. The molten hot melt adhesive may flow along the abutting surfaces of the two ends. When the molten hot melt adhesive cools and solidifies, a structurally sound seam, or joint, is created. A center tube assembly (not shown) may then be inserted in the interior 286 of filter 280. In use, the fluid to be filtered flows through the center tube assembly and radially outwardly through a plurality of holes (not shown) formed about the periphery of the center tube assembly and then through filter 280.

While the foregoing description has set forth preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. An apparatus for melting and dispensing thermoplastic material comprising:
   an un-heated hopper having an inlet for receiving particles of a thermoplastic material and an outlet for discharging the particles;
   a heated manifold including at least one cavity formed therein, said at least one cavity having an inlet communicating with said outlet of said hopper for receipt of the particles of the thermoplastic material from said hopper, said hopper being disposed external of said heated manifold, said at least one cavity further including an outlet communicating with a pump supply passage, and further including a pump discharge passage, said heated manifold effective for melting the particles into molten thermoplastic material therein;
   a pump including an inlet and an outlet, said inlet of said pump being in fluid communication with said pump supply passage and with said outlet of said at least one cavity, and said outlet of said pump being in fluid communication with said pump discharge passage; and
   a dispenser including an inlet and an outlet, said pump discharge passage of said heated manifold being in fluid communication with said inlet of said dispenser for delivering molten thermoplastic material to said dispenser, said outlet of said dispenser effective for dispensing the molten thermoplastic material therethrough.

2. The apparatus as recited in claim 1, wherein:
   said pump is mounted on said manifold; and
   said dispenser is mounted on said manifold.

3. The apparatus as recited in claim 1, further comprising:
   a plurality of said cavities formed in said manifold, said cavities spaced apart from one another, each said cavity having an inlet communicating with said outlet of said hopper and an outlet; and
   a collector passage fluidically coupled with said outlet of each of said cavities, said collector passage including an outlet in fluid communication with said inlet of said pump.

4. The apparatus as recited in claim 3, wherein:
   said heated manifold further comprises a plurality of fins, each of said fins being disposed intermediate two adjacent ones of said cavities.

5. The apparatus as recited in claim 4, wherein:
   each of said fins has a triangular-shaped cross-section with an apex extending into said outlet of said hopper.

6. The apparatus as recited in claim 1, wherein:
   said hopper is made of a polymeric material.

7. The apparatus as recited in claim 1, further comprising:
   an un-heated hose coupled at one end to said inlet of said hopper and having an opposite end effective for receiving the particles of thermoplastic material therethrough.

8. The apparatus as recited in claim 7, wherein:
said opposite end of said hose is operatively coupled to a source of pressurized air whereby said opposite end of said hose is effective for suctioning the particles of the thermoplastic material from a supply reservoir of the particles, said hose being effective for transporting the particles to said inlet of said hopper when the pressurized air is flowing within said hose.

9. The apparatus as recited in claim 8, wherein:
said hopper includes an upper portion comprising said inlet of said hopper and further comprising a plurality of apertures formed therein and disposed about a periphery thereof, said apertures being effective for exhausting pressurized air entering said hopper from said hose.

10. An apparatus for melting and dispensing thermoplastic material, comprising:
an un-heated hopper having an inlet for receiving particles of a thermoplastic material and an outlet for discharging the particles, said hopper further including a longitudinal axis;
a device effective for moving the particles of the thermoplastic material around and along said longitudinal axis of said hopper and through said outlet of said hopper;
a heated manifold including at least one cavity formed therein, said at least one cavity having an inlet communicating with said outlet of said hopper for receipt of the particles of the thermoplastic material from said hopper, said hopper being disposed external of said heated manifold, said at least one cavity further including an outlet communicating with a pump supply passage, and further including a pump discharge passage, said heated manifold effective for melting the particles into molten thermoplastic material therein;
a pump including an inlet and an outlet, said inlet of said pump being in fluid communication with said pump supply passage and with said outlet of said at least one cavity, and said outlet of said pump being in fluid communication with said pump discharge passage; and
a dispenser including an inlet and an outlet, said pump discharge passage of said heated manifold being in fluid communication with said inlet of said dispenser for delivering molten thermoplastic material to said dispenser, said outlet of said dispenser effective for dispensing the molten hot melt adhesive therethrough.

11. The apparatus as recited in claim 10, wherein:
said device is an auger disposed within said hopper.

12. The apparatus as recited in claim 10, wherein:
said dispenser is mounted on said heated manifold.

13. The apparatus as recited in claim 10, wherein:
said pump is mounted on said heated manifold.

14. The apparatus as recited in claim 11, wherein:
said auger includes a shaft and a helical blade integral with said shaft, said blade having a substantially constant major diameter.

15. The apparatus as recited in claim 11, wherein:
said auger includes a shaft and a helical blade integral with said shaft, said blade having a tapered major diameter.

16. The apparatus as recited in claim 10, further comprising:
a first motor drivingly coupled with said auger; and
a second motor drivingly coupled with said pump.

17. The apparatus of claim 1, further comprising:
a connecting structure operatively coupling said hopper to said manifold and inhibiting heat transfer therebetween;
wherein said connecting structure further comprises a clamp.

* * * * *